Figure 1:
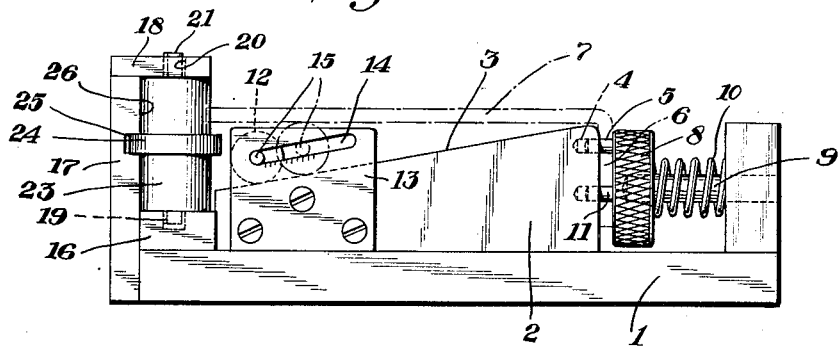

Sept. 26, 1950  R. T. RELF  2,523,329
GAUGE DEVICE
Filed Feb. 3, 1945

INVENTOR.
REGINALD T. RELF
BY
ATTORNEY

Patented Sept. 26, 1950

2,523,329

UNITED STATES PATENT OFFICE 2,523,329

GAUGE DEVICE

Reginald T. Relf, Chatham, N. J., assignor to Federal Telephone and Radio Corporation, New York, N. Y., a corporation of Delaware Application February 3, 1945, Serial No. 576,055

8 Claims. (Cl. 33—125)

This invention relates to precision gauges such as are employed for testing the accuracy of the dimensional form of small and standardized parts to insure of proper fit in commercial production.

A primary object of the invention is to provide a simple portable or hand tool type of testing gauge adapted for quickly and easily testing parts by the simple expedient of tilting of the gauging device to different positions. As a further feature it includes a design and arrangement operative by tilting in different directions for two dimensional gauging of the part or work piece without shifting of the latter from a retained position.

The aforesaid and other features and advantages of the present improvements will be more fully understood by reference to the accompanying drawings wherein like reference characters are applied to the corresponding parts in the different views.

Figure 2:
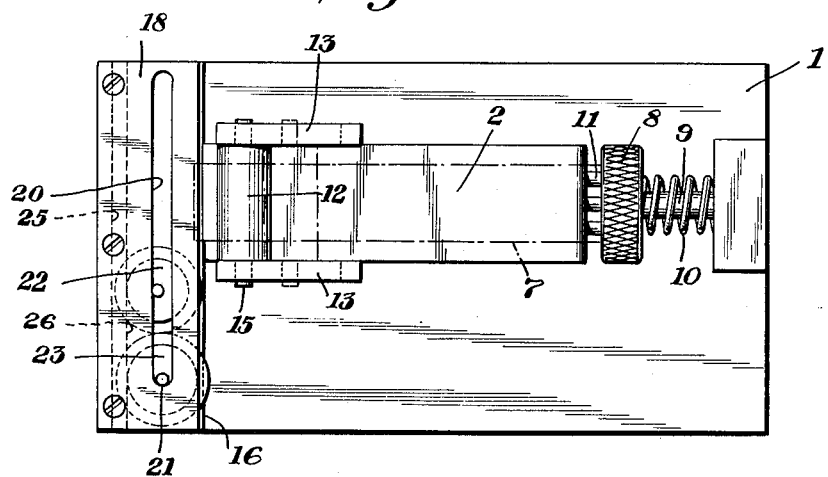

In the drawings,

Fig. 1 is a view in side elevation of a gauging device embodying the features of the invention; and Fig. 2 is a plan view thereof.

In the particular form of the improved gauging device as herein shown embodying the features of the invention, the device is specially designed for checking or measuring the angularity or squareness and likewise the milled length of magnet relay heel pieces such as are used in connection with automatic signal and telephone systems. The special use is illustrative of many commercial instances wherein the accurate gauging or checking of similar articles is required to insure standardization of parts as to dimension or form within close tolerances. The gauging device is designed to include a quick action supporting and retaining means for rigidly securing the part in position for testing and a gauging means cooperatively related to the part so held and operative by a simple tilting and gravitational shifting of movable gauging members to quickly and accurately indicate the conformity or non-conformity of the part to the dimensional requirements. The device is accordingly designed as a portable hand tool for gauging of the parts adapted to facilitate the testing by the mere tilting of the device first in one direction and then another.

In the preferred embodiment as illustrated the device consists of a rectangular base 1 upon which is mounted or formed integral therewith an upwardly extending bearing member or anvil 2 formed with an inclined bearing surface 3 on its upper side and having its rearward end portion provided with a series of bores 4 drilled in its end and corresponding in position and spacing to the usual apertures 5 provided in the angular end portion 6 of the heel piece 7 to be tested. A quick release securing means is cooperatively associated with the bores for retaining the work consisting of a knurled finger grip member 8 slidably fitted on a bearing shaft 9 supported in a bearing portion of the support 1. The grip member 8 is urged forwardly by the coil spring 10 fitted on the shaft 9 in position interposed between the bearing and the grip member. The grip member on its forward face is provided with a series of pins 11 positioned to register with the apertures 5 of the heel piece and the bores 4 in alignment therewith. There is thus provided a quickly operable, yieldable, securing means effective firmly to retain the part or heel piece in position for testing.

The gauging operation in the illustration as given has for its purpose first to determine if the heel piece is of proper angularity or squareness which is of importance in establishing that the core of the magnetic coil with which it is used is properly parallel to the heel piece at the armature or front end to insure that the armature engages the cores squarely so as to avoid magnetic difficulties in the proper operation. For this test, a gravity operated testing roller 12 is provided and positioned to bear upon the inclined bearing surface 3 of the bearing member 2 and is retained in its operating position by means of oppositely positioned retaining plates 13—13 secured to the side of the bearing member 2 and extending thereabove where they are formed with elongated retaining slots 14 to receive axial pin extensions 15 of the roller.

These slots are oppositely positioned and aligned to extend at an inclination parallel to the inclined bearing surface 3. The gravity testing roller 12 is ground to close dimension and desirably is of a diameter to engage the under surface of a heel piece of correct squareness or form at a position substantially midway of the length of the slot 14 (as shown in dotted lines at the right in the figures) whereby its centralized stop position upon tilting of the tool in the clockwise direction will indicate a correct form of the angularity of the work piece. The tool is positioned so that the angular bearing surface is tilted anti-clockwise from horizontal during the insertion or securing of the heel piece in position as is readily understood. One of the retaining plates 13 may be provided with suitably spaced graduations or markings to indicate a tolerance or variation of angularity as may be permissible for production purposes.

In further accordance with the invention an additional gravity gauging means is incorporated with the device insofar as described and operative in another direction of movement, perpendicular to that of the roller 12 as shown, thereby to provide for two dimensional checking of a retained part. In the example as shown this additional gravity testing means is employed to gauge for correctness the milled length of the heel piece with a given degree of tolerance. The structural arrangement therefor includes upwardly extending bearing portions 16, 17 united with the base and an upper bearing member 18 secured by screws to the portion 17. The bearing members 16 and 18 are provided with parallel transversely extending slots 19 and 20 within which are fitted to slide axial pins 21 formed upon testing rollers 22 and 23. Both of the test rollers 22 and 23 are retained within the slots 19—20 to be shiftable longitudinally thereof and to prevent tilting in the plane parallel to the elongated slot they are each provided with an annular collar or flange 24 slidably received within a groove 25 in the member 17 extending longitudinally parallel to guide slots 19—20. The use of the annular flanges on the rollers centrally positioned as shown permits of the rollers being of axial dimensions such as to have a looser fit thereby to be more freely shiftable without tendency to bind.

The inward bearing surface 26 of the support 17 and the slots 19—20 are straight and in parallel relation and are parallel to the milled end of the heel piece, the length of which is to be tested. To the end of testing for allowable lengths within a predetermined degree of tolerance, the rollers 22 and 23 are closely ground to be of smaller and larger diameter respectively. The rearward roller 22 (Fig. 2) is of such diameter that it will roll or move between the relay heel piece and the surface 26 of the fixture when the heel piece is of the allowable or correct length or shorter. This roller may accordingly be termed a GO roller in that its passage by the end of the part under test indicates that the part is not of excessive length. The forward roller 23, of larger diameter, is of such dimension that it will not roll between the end of the heel piece or part under test and the left hand end of the fixture if the heel piece is of the correct length but will roll between these parts if the heel piece has been ground too short. It may accordingly from an operational standpoint be referred to as a NO-GO roller. The difference in the diameters of the respective rollers as will be appreciated is proportionate to an allowable tolerance in the dimension of the parts. In the testing as to length by means of the gravity rollers 22, 23 the work piece is inserted with the device tilted forwardly to position the rollers forwardly as shown in Fig. 2 and the gauging is performed upon then tilting of the fixture rearwardly so that the rollers tend to move to the opposite or rearward ends of the slots 19—20. In this operation the passage of the GO roller 22 will indicate that the length of the part is not excessive and if the part is of correct length, the NO-GO roller 23 by engagement therewith will be arrested in its movement thereby indicating that the test part is of sufficient length. If on the other hand the test part is too short the free passage of the roller will so indicate.

The improved gauging tool or fixture as described permits of conveniently and quickly inserting a work piece and retaining it in a secured position for two dimensional testing by simple manipulation of the tool to effect gravitational movement of the testing rollers. It thus combines in a single device provision for gravity roller checking by movement of rollers shiftable with relation to a fixed position of the part and with directions of movement in perpendicular relation thus to be non-interfering and permitting of tilting of the device to a position where all rollers assume a starting position with relation to the part and the testing operations thereafter performed by tilting of the device clockwise and then rearwardly in the manner readily understood.

While there is shown a preferred embodiment of the invention, it will be understood that various modifications may be made therein without departing from the scope of the invention as defined in the claims.

What is claimed is:

1. A gauge device comprising a support, yieldable securing means on the support for engaging a part to secure it in test position, a test roller slidably retained on the support and shiftable by gravity for test engagement with the part by tilting of the device and said support being provided with a straight-edge bearing angularly disposed relative to the surface of the part to be tested and engaged by the test roller.

2. A gauge device comprising a support, means for detachably securing a part thereto in a test position, a straight-edge bearing on the support in angular relation to the part, bearing plates at opposite sides of the bearing and provided with opposite elongated slots parallel to the bearing, a test roller having axial pins fitted to the slots whereby the roller is retained to be shiftable by gravity for test engagement with the part on tilting of the device.

3. A gauge device comprising a support, means to support a part thereon in a test position, said support being provided with a pair of elongated bearing slots spaced relative to a surface of the part to be tested and at least two test rollers having axial pins fitted to the slots and shiftable therein by gravity for test engagement with the part.

4. A gauge device comprising a supporting member, means to support a part to be tested in a test position thereon, roller testing elements slidably retained on the supporting member and to be shiftable by gravity for test engagement with the part with a rectilinear path of movement, said roller elements being of different diameter, the smaller being of a size to clear the part unless of excessive length and the other being of a size to be arrested by engagement with the part unless the latter is of deficient length.

5. A gauge device as claimed in claim 4 wherein the roller elements are retained within elongated bearing slots and further comprising means engaging the rollers to prevent endwise tilting thereof.

6. A gauge device comprising a supporting member, means detachably securing a part to be tested in a test position thereon, said support being provided with aligned elongated bearing slots providing a guideway bearing spaced with relation to the part under test, at least two test rollers having axial pins fitted to said slots and shiftable by gravity for test engagement with the part by tilting of the device, one of said rollers being of a diameter to clear the part unless of excessive length and the other of said rollers being of a diameter to be arrested in its movement by the part unless the latter is of deficient length.

7. A gauge device as claimed in claim 6 wherein each of the rollers is provided centrally thereof with an annular collar and wherein the support is provided with a guide recess to receive said collar and extending parallel to the path of roller movement.

8. A gauge device according to claim 1, wherein the straight edge of said support is disposed at an acute angle to the surface of the part to be tested.

REGINALD T. RELF.

REFERENCES CITED

The following references are of record in the file of this patent:

UNITED STATES PATENTS

| Number | Name | Date |
|---|---|---|
| 1,013,396 | Johnson | Jan. 2, 1912 |
| 1,540,969 | Walen et al. | June 9, 1925 |
| 1,544,762 | King | July 7, 1925 |
| 1,765,909 | Eberhardt | June 24, 1930 |
| 1,857,071 | Tull | May 2, 1932 |
| 2,356,242 | House | Aug. 22, 1944 |

FOREIGN PATENTS

| Number | Country | Date |
|---|---|---|
| 116,256 | Germany | Dec. 21, 1900 |
| 535,675 | Great Britain | Apr. 17, 1941 |